United States Patent Office 3,318,869
Patented May 9, 1967

3,318,869
COMPLEX NITRILES CONTAINING THE AZABICYCLOALKANE STRUCTURE
John W. Cusic, Skokie, and Peter Yonan, Chicago, Ill., assignors to G. D. Searle & Co., Chicago, Ill., a corporation of Delaware
No Drawing. Filed May 18, 1966, Ser. No. 550,958
8 Claims. (Cl. 260—239)

The present application is a continuation-in-part of applicants' copending application Ser. No. 502,289, filed Oct. 22, 1965, now U.S. Patent 3,299,044; and that application is a continuation-in-part of application Ser. No. 367,227, filed May 13, 1964, and now abandoned.

The present invention relates to a group of N-substituted azabicycloalkanes wherein the nitrogen substituent is a complex substituted alkyl group. The substituents on the alkyl group can include phenyl, pyridyl, and a nitrile functional group. In particular, the present invention relates to nitriles having the following general formula

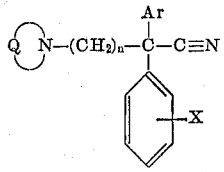

wherein QN— is an azabicycloalkane group; $n$ is a whole number greater than 1 and less than 4; Ar is selected from the group consisting of phenyl and pyridyl; and Y is selected from the group consisting of hydrogen and halogen. The halogens can be fluorine, chlorine, bromine, or iodine.

The azabicycloalkane group referred to above preferably contains from 7 to 9 carbon atoms in addition to the nitrogen atom through which it is attached to the remainder of the molecule. It is further preferred that no ring in the azabicycloalkane structure contains fewer than 5 atoms. Azabicyclononanes are of particular interest as this type of group. Examples of such structures are 3 - azabicyclo[3.2.2]nonane, 2 - azabicyclo[3.2.2]nonane, 2-azabicyclo[3.3.1]nonane, 3-azabicyclo[3.3.1]nonane, 2-azabicyclo[4.3.0]nonane, 7-azabicyclo[4.3.0]nonane, and 8-azabicyclo[4.3.0]nonane. Some examples of azabicyclooctane groups are 6-azabicyclo[3.2.1]octane, 3-azabicyclo[3.2.1]octane, 2-azabicyclo[3.2.1]octane, and 2-azabicyclo[2.2.2]octane. Examples of azabicyclodecane are 8-azabicyclo[4.3.1]decane, 2-azabicyclo[4.4.0]decane, and 7-azabicyclo[4.2.2]decane. In addition, a double bond can be present as part of the azabicycloalkane structure. Examples of groups of this type are 3-azabicyclo[3.2.2]non-6-ene and 8-azabicyclo[4.3.0]non-3-ene. In no case does the nitrogen occupy a bridgehead position in the bicyclic structure.

A number of procedures are available for the preparation of the compounds of this invention. Their applicability varies depending on the particular structure of the product desired. Thus, to prepare an α,α-diphenylalkanonitrile or similar substituted phenyl compounds, a useful procedure involves the reaction of an appropriate azabicycloalkane with a halide of the formula

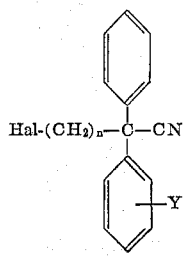

wherein $n$ and Y are defined as above and Hal is chlorine or bromine.

Alternately, the nitriles can be prepared by the reaction of an acetonitrile of the formula

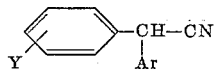

first with sodamide and then with an alkyl halide of the formula

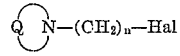

wherein Hal is chlorine or bromine and the other groups are defined as above. When Ar is pyridyl, the intermediate acetonitrile is obtained by the reaction of a benzyl cyanide with sodamide and an appropriate chloro- or bromo-substituted pyridine.

The organic bases of this invention form non-toxic, acid-addition salts with a variety of organic and inorganic acids. Such salts are formed with acids such as sulfuric, phosphoric, hydrochloric, hydrobromic, hydriodic, sulfamic, citric, lactic, maleic, malic, succinic, tarttaric, cinnamic acetic, benzoic, gluconic, ascorbic, and related acids.

The compounds of the present invention are useful for a number of purposes. Thus, they possess activity as anti-inflammatory agents and anti-ulcer agents. They also possess anti-biotic activity against a variety of organisms. Thus, they inhibit the growth of bacteria such as *Diplococcus pneumoniae*, protozoa such as *Tetrahymena gelleii*, and algae such as *Chlorella vulgaris*. The compounds of the present invention are also useful as intermediates in that they can be hydrolyzed to the corresponding amides. The conversion of these nitriles to amides and the usefulness of such amides are described in detail in applicants' copending application, Ser. No. 502,289, filed Oct. 22, 1965.

The following examples are presented to further illustrate the present invention; they should not be construed as limiting it in spirit or in scope. In these examples, quantities are indicated in parts by weight and temperatures in degrees centigrade (° C.).

*Example 1*

A mixture of 300 parts of 3-bromopropanol, 250 parts of 3-azabicyclo[3.2.2]nonane, and 280 parts of potassium carbonate in 1200 parts of butanone is refluxed for 6 hours. The resultant mixture is filtered to remove the precipitate salt and the filtrate is distilled at reduced pressure. The portion distilling at about 145–160° C. at 5 mm. pressure is collected as 3-(3-hydroxypropyl)-3-azabicyclo[3.2.2]nonane.

A solution of 100 parts of 3-(3-hydroxypropyl)-3-azabicyclo[3.2.2]nonane in 375 parts of chloroform is saturated with hydrogen chloride gas. To this solution there is added, portionwise, 120 parts of thionyl chloride and the resultant mixture is refluxed for 1 hour. The mixture is then concentrated and ether is added. This causes a precipitate to form. This solid is recrystallized from a mixture of ethanol and ether to give 3-(3-chloropropyl)-3-azabicyclo[3.2.2]nonane hydrochloride melting at about 262–265° C. This salt can readily be converted to the free amine by dissolving it in water and adding alkali.

*Example 2*

A mixture of 60 parts of 4-bromo-2,2-diphenylbutyronitrile, 25 parts of 3-azabicyclo[3.2.2]nonane and 30 parts of anhydrous potassium carbonate in 400 parts of butanone is refluxed for 7 hours. The resultant mixture is filtered and the solvent is evaporated from the filtrate under reduced pressure. The residue is dissolved in benzene and treated with charcoal. The resultant filtrate is concentrated and ether is added, whereupon a precipitate forms. This solid is recrystallized from a mixture of 2-propanol and ethyl acetate to give 2,2-diphenyl-4-(3-azabicyclo[3.2.2]non-3-yl)butyronitrile. This compound has the following formula

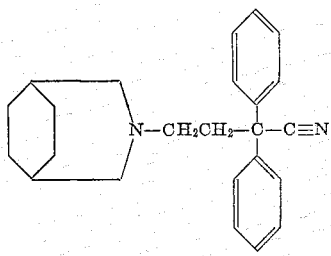

Example 3

A mixture of 54 parts of 5-chloro-2,2-diphenyl valeronitrile (obtained from the reaction of a benzene solution of diphenylacetonitrile first with sodamide and then with 1,3-dichloropropane), 25 parts of 3-azabicyclo[3.2.2] nonane, 30 parts of potassium carbonate, and 15 parts of sodium iodide in 400 parts of butanone is refluxed for 6 hours. The mixture is filtered to remove solids and the solvent is evaporated from the filtrate. The residue is dissolved in benzene and treated with charcoal. The solvent is evaporated from the treated solution to leave the free base which is converted to the hydrochloride by dissolving it in 2-propanol and adding a solution of excess hydrogen chloride in 2-propanol. The product thus obtained is 2,2-diphenyl-5-(3-azabicyclo[3.2.2]non-3-yl) valeronitrile hydrochloride melting at about 272–273° C.

Example 4

A mixture of 25 parts of benzyl cyanide, 35 parts of 2-bromopyridine and 220 parts of dry toluene is heated to 80° C. with stirring. Then, 19 parts of sodamide is added portionwise over a period of 1 hour while the temperature is maintained at 80–85° C. with some cooling. The resultant mixture is heated to 105° C. and a solution of 56 parts of 3-(2-chloroethyl)-3-azabicyclo[3.2.2]nonane in 220 parts of dry toluene is added portionwise. The mixture is then heated at 105–110° C. for an additional 3 hours before it is cooled and 250 parts of water is added. The organic layer is separated and dried and the solvent is evaporated to leave a residue which is dissolved in ether and filtered. The ether solvent is evaporated from the filtrate and the residual oil is distilled under reduced pressure to give material boiling at 200–201° C. at 0.1 mm. pressure. The product thus obtained is crystallized from hexane to give 2-phenyl-2-(2-pyridyl)-4-(3-azabicyclo[3.2.2]non-3-yl)butyronitrile melting at about 80–81° C. This compound has the following formula

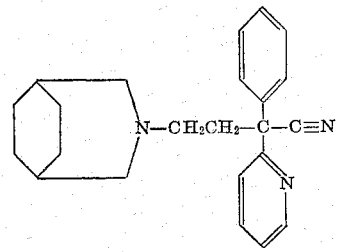

Example 5

An equivalent quantity of 4-bromopyridine is substituted for the 2-bromopyridine and the procedure described in Example 4 is repeated. In this way, there is obtained 2 - phenyl - 2 - (4 - pyridyl) - 4 - (3 - azabicyclo[3.2.2] non-3-yl)butyronitrile.

Example 6

An equivalent quantity of 4-chlorobenzyl cyanide is substituted for the benzyl cyanide and the procedure described in Example 4 is repeated. In this way, there is obtained 2 - (4 - chlorophenyl) - 2 - (2 - pyridyl) - 4 - (3-azabicyclo[3.2.2]non-3-yl)butyronitrile.

Example 7

The procedure of Example 4 is repeated using 60 parts of 3 - (3 - chloropropyl) - 3 - azabicyclo[3.2.2]nonane in place of the 3-(2-chloroethyl)-3-azabicyclo[3.2.2] nonane. In this case, the residual oil obtained from the alkylation procedure is recrystallized from hexane to give 2 - phenyl - 2 - (2 - pyridyl) - 5 - (3 - azabicyclo [3.2.2]non-3-yl)valeronitrile melting at about 86–87° C. This compound has the following formula

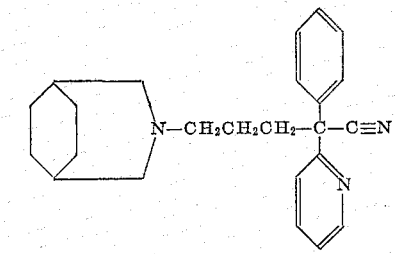

Example 8

To 2.8 parts of lithium amide in 450 parts of dry toluene there is added 19.3 parts of diphenylacetonitrile. The resultant mixture is stirred and refluxed under nitrogen for 2 hours. Then, a solution of 18.8 parts of 7-(2-chloroethyl)-7-azabicyclo[4.3.0]nonane in 870 parts of dry toluene is added portionwise. The resultant mixture is stirred and refluxed for 15 hours. The mixture is decomposed by the addition of water and then washed with dilute sodium hydroxide solution, dried, and distilled. This gives 2,2-diphenyl-4-(7-azabicyclo[4.3.0]non-7-yl-) butyronitrile distilling at about 203–210° C. at 0.15 mm. pressure.

The 7-(2-chloroethyl)-7-azabicyclo[4.3.0]nonane used as the starting material is prepared by the following procedure. 40 parts of octahydroindole and 22 parts of ethylene oxide are dissolved in 400 parts of methanol and the solution is allowed to stand for 15 hours. The solvent is then evaporated under reduced pressure and the residue is distilled to give 1-(2-hydroxyethyl)octahydroindole boiling at about 84–102° C. at 1 mm. pressure. 24 parts of this alcohol is then dissolved in 530 parts of methylene chloride and the solution is saturated with hydrogen chloride gas. Thionyl chloride (160 parts) is added to the solution which is then refluxed for one hour. Low boiling materials are then removed under reduced pressure and dry benzene is added to the residue. The benzene is removed under reduced pressure and the addition and removal of benzene is repeated. The residue which results is dissolved in 130 parts of methylene chloride and the solution is diluted with about 550 parts of ethyl acetate. The resultant solution is treated with charcoal, filtered and concentrated under reduced pressure until crystals form in the residue. The resultant precipitate is collected by filtration and dried to give 7-(2-chloroethyl)-7-azabicyclo[4.3.0]nonane as a hygroscopic white powder melting at about 127–130° C.

Example 9

A solution of 17 parts of 8-azabicyclo[4.3.0]nonane hydrochloride, 36.0 parts of 4-bromo-2,2-diphenylbutyronitrile, 9.0 parts of powdered sodium hydroxide, and 10 parts of triethylamine in 110 parts of dimethyl sulfoxide is heated on a steam bath for 16 hours. The resultant mixture is poured into water and made strongly alkaline. The mixture is then extracted with ether and the combined ether extracts are washed well with water and then extracted with 10% hydrochloric acid. The resultant acid extract is made alkaline with sodium hydroxide solution and then extracted with ether. The combined ether extracts are dried, the solvent is evaporated, and the residual oil is distilled to give 2,2-diphenyl-4-(8-azabicyclo[4.3.0]non-8-yl)butyronitrile boiling at 220–225° C. at 0.3 mm. pressure. This compound has the following formula

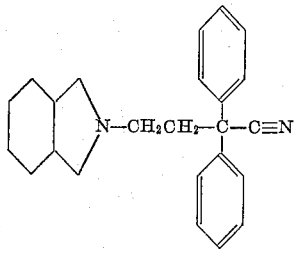

*Example 10*

The procedure of the first paragraph of Example 9 is repeated using 46.3 parts of 4-bromo-2,2-diphenyl-butyronitrile, 28 parts of 2-azabicyclo[4.4.0]decane, 20 parts of triethylamine and 110 parts of dimethyl sulfoxide. In this case, the product is 2,2-diphenyl-4-(2-azabicyclo[4.4.0]dec-2-yl)butyronitrile which is a yellow oil boiling at about 221–222° C. at 0.4 mm. pressure.

*Example 11*

The procedure of the first paragraph of Example 9 is repeated using 12.6 parts of 6-azabicyclo[3.2.1]-octane hydrochloride, 25.6 parts of 4-bromo-2,2-diphenyl-butyronitrile, 7.2 parts of powdered sodium hydroxide, 10 parts of triethylamine, and 110 parts of dimethyl sulfoxide. The nitrile resulting from this reaction boils at about 210–215° C. at 1.0 mm. pressure. It is 2,2-diphenyl-4-(6-azabicyclo[3.2.1]oct-6-yl)butyronitrile. This compound has the following formula

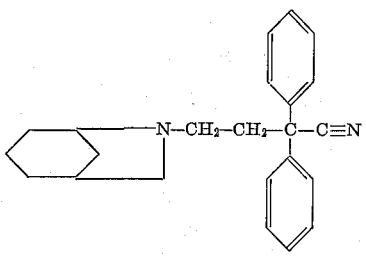

*Example 12*

Diphenylacetonitrile is reacted with 2-(2-chloroethyl)-2-azabicyclo[2.2.2]octane according to the procedure described in Example 8. The product obtained is 2,2-diphenyl-4-(2-azabicyclo[2.2.2]oct-2-yl)butyronitrile.

What is claimed is:
1. A compound of the formula

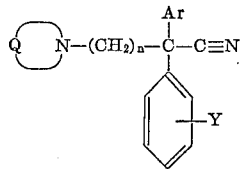

wherein QN— is azabicycloalkyl containing from 7 to 9 carbon atoms and containing at least 5 atoms in each ring of the azabicycloalkane structure; $n$ is a whole number greater than 1 and less than 4; Ar is selected from the group consisting of phenyl and pyridyl; and Y is selected from the group consisting of hydrogen and chlorine.

2. A compound according to claim 1 which has the formula

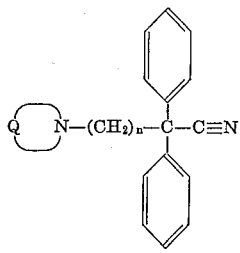

wherein QN— is azabicycloalkyl containing from 7 to 9 carbon atoms and containing at least 5 atoms in each ring of the azabicycloalkane structure; and $n$ is a whole number greater than 1 and less than 4.

3. A compound according to claim 1 which is 2,2-diphenyl-4-(3-azabicyclo[3.2.2]non-3-yl)butyronitrile.

4. A compound according to claim 1 which is 2,2-diphenyl-5-(3-azabicyclo[3.2.2]non-3-yl)valeronitrile.

5. A compound according to claim 1 which is 2,2-diphenyl-4-(8-azabicyclo[4.3.0]non-8-yl)butyronitrile.

6. A compound according to claim 1 which is 2,2-diphenyl-4-(2-azabicyclo[4.4.0]dec-2-yl)butyronitrile.

7. A compound according to claim 1 which is 2-phenyl-2 - (2 - pyridyl) - 4 - (3 - azabicyclo[3.2.2] - non - 3-yl)-butyronitrile.

8. A compound according to claim 1 which is 2-phenyl - 2 - (2 - pyridyl) - 5 - (3 - azabicyclo[3.2.2]non-3-yl)-valeronitrile.

No References cited.

ALEX MAZEL, *Primary Examiner.*
ALTON D. ROLLINS, *Assistant Examiner.*